INVENTOR
JOHN TINDALE

Oct. 15, 1963   J. TINDALE   3,107,109
LATCHING DEVICE FOR USE WITH ELONGATED
ARTICLES OF ROD OR TUBE FORM
Filed Sept. 21, 1960   2 Sheets-Sheet 2

INVENTOR
JOHN TINDALE
BY
ATTORNEY

United States Patent Office 3,107,109
Patented Oct. 15, 1963

3,107,109
LATCHING DEVICE FOR USE WITH ELONGATED ARTICLES OF ROD OR TUBE FORM
John Tindale, West Kingsdown, England, assignor to Elliott Brothers (London) Limited, London, England, a British company
Filed Sept. 21, 1960, Ser. No. 57,435
Claims priority, application Great Britain Sept. 25, 1959
11 Claims. (Cl. 287—58)

This invention relates to a latching device for use with elongated articles or members such as rods or tubes, chains and wire-ropes, all for convenience of description hereinafter referred to as rods.

According to the present invention a rod latching device comprises relatively movable inner and outer tubular members, encompassing the rod, said inner member carrying detent elements projectible in consequence of relative movement between said members into and out of positions wherein movement on the part of the rod is imparted or not imparted to said inner member, a predetermined number of backward and forward movements of the rod being necessary before the inner member unlatches the rod.

Preferably the inner and outer members are so interconnected that unidirectional cyclical rotational movement of said inner member is secured during both forward and reverse movements of the rod.

The invention has particular reference to the latching of a vertically reciprocatable rod under such conditions that more than one up-and-down movement of the rod must be performed in order to release it from the latching device. In this case, the above-mentioned inner and outer concentric members may be mounted capable of relative rotation, the repeated movement of the rod within the inner member being utilized to transmit limited endwise linear movement thereto, endwise displacement of the rod in one direction at least being meanwhile restricted. During the limited linear movements of the inner member an intermittent rotary movement is imparted thereto to effect unlatching of the rod for its unrestricted endwise displacement, after the performance thereby of a predetermined number of reciprocations.

An example of a suitable application of the invention is in connection with the suspensions of control rods and the like of a nuclear reactor. In this connection, it is required at times to elevate the control rod to a fully retracted position or to remove the rod entirely. The latching and releasing of a reactor control rod is of necessity remotely controlled and it is therefore important that any latching device employed should not place reliance upon components, such as springs, which may fail in operation. A suitable form of latching device for this application is one in which the rod must perform a predetermined number of up-and-down movements in relation to the device before becoming unlatched and thus free to be lowered again into the reactor.

A latching device in accordance with this invention is especially suited for use in the latching of a reactor control rod suspendable for raising and lowering purposes on a winch cable, and by way of example, a latching device for this particular use will now be more particularly described with reference to the accompanying drawings wherein:

FIGURE 8 is a development, in elevation, of one component of the latching device—the inner member thereof already referred to.

Figure 1:
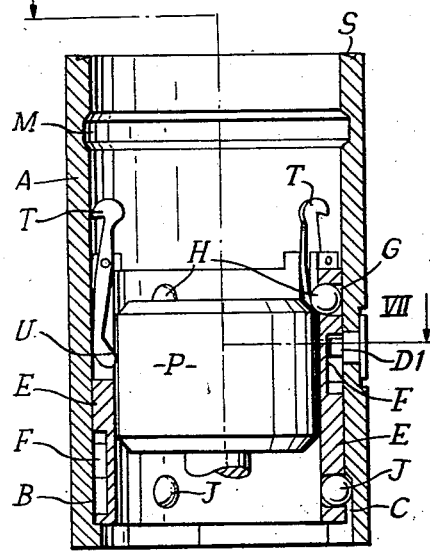
FIGURE 1 is a vertical sectional view of the control rod latching device, the line of section being shown at I—I in FIGURE 7.

The control rod latching device illustrated in the drawings comprises a latching sleeve E vertically slidable within a fixed cylindrical housing A which is attached to the lower end of the control rod winch mechanism; sleeve E and housing A respectively constitute the relatively movable inner and outer members above referred to. The sleeve E encircles the cylindrical disc-like head of a reactor control rod P to which raising and lowering movements have to be imparted, and the head of control rod P is of a diameter such as will afford appreciable clearance between its periphery and the bore of sleeve E. The head of the control rod P is adapted to be attached by suitable means (not shown) to the end of a cable forming part of a hoisting winch.

The sleeve E is provided with a number of through holes G, arranged in upper and lower rows, accommodating a corresponding number of balls, namely a series of upper balls H and a similar series of lower balls J; these balls constitute the detent elements previously referred to. The balls, H, J, are limited as to inward movement by constricting, such as by peening, the inner entrances of holes G.

In the embodiment illustrated, six equal size balls are employed, three balls H vertically aligned with three balls J. The diameter of each ball H or J is so determined in relation to the thickness of sleeve E that unless clearness is provided at the outside of sleeve E the ball H or J is forced by the encircling housing A to project into the sleeve bore an extent sufficient to block the passage of the head of rod P through the sleeve E.

The needed clearance is provided by relieving the bore of housing A, that is, by machining three equicircumferentially spaced, equal width clearance recesses C, separated by arcuate lands B flush with the housing bore.

The upper and lower balls H and J, respectively, are adapted, on the one hand, to be moved radially inwards by contact with the continuous surface of the upper end of the bore of housing A or with one of the lands B contiguous therewith. On the other hand, the lower balls J are given freedom to move radially outwards or are moved thus by reason of contact with chamfers on the rod head P when aligned with a clearance recess C; on occasion during operation of the appliance the upper balls H may be elevated sufficiently to align with a circular recess M in housing A and thus permit of outward radial movement of said balls H to allow rod P to be lifted above or beyond them. Normally, however, the balls H are maintained in their inwardly projecting positions, whereas balls J may be either in their inwardly projecting positions when aligned with lands B or their outwardly projecting positions when aligned with recesses C; the relative dispositions of the head of rod P, sleeve E and balls H, J will be readily appreciated on a comparison of the various figures of the drawings. For convenience, FIGURES 1 to 5 of the drawings show the sleeve E in an angularly fixed position with housing A angularly moved relatively to the sleeve. It will be appreciated that, in fact, the housing is stationary and the sleeve rotates relatively thereto.

The alignment of balls J with a land B, or with a recess C in housing A is effected by rotating sleeve E therewithin. This rotation of sleeve E is brought about by a pin-and-slot connection between housing A and sleeve E, so arranged that as sleeve E is raised and lowered by rod P (through contact of its head with the inwardly projecting balls H, J) the sleeve is intermittently and unidirectionally partially rotated within housing A. A single zig-zag groove F formed on the exterior periphery of sleeve E and three equicircumferentially spaced guide pins D1, D2, D3, carried by the fixed housing A (and inwardly projecting so as at all times to engage groove F) constitute the pin-and-slot connection in the illustrated embodiment.

Three pivotally mounted triggers T are spaced regularly around the top end of sleeve E, and an annular groove S is machined around the top end of the housing A. The triggers are engageable in the groove S to hold the sleeve in a raised position (FIGURE 4).

Figure 4:
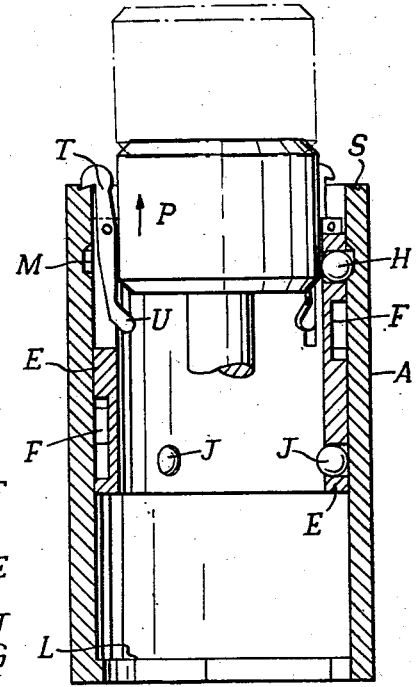
Figure 5:
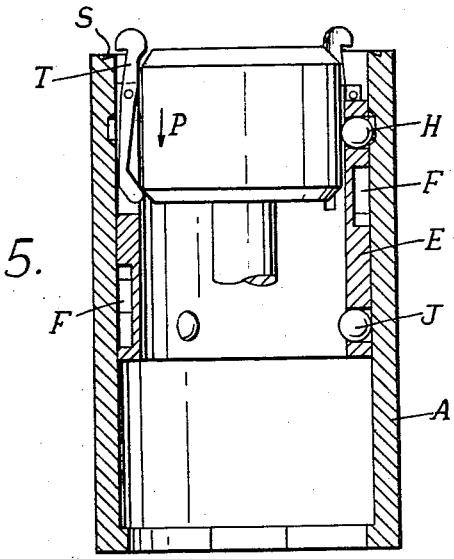

Assume the control rod has been lowered into the reactor by the winch cable and that it is now required to lift said rod and latch it in its fully retracted position; it is to be understood that for purposes of its complete removal the control rod may be raised above this fully retracted position as indicated in FIGURE 4.

Figure 2:
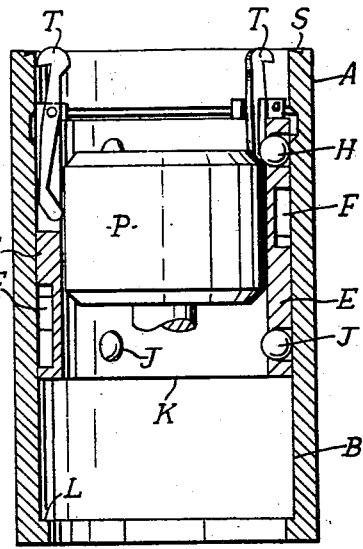
FIGURES 2, 3, 4 and 5 are fragmentary vertical sectional views showing, diagrammatically, other relative positions assumed by the control rod and latching device components during use of the device.
Figure 3:
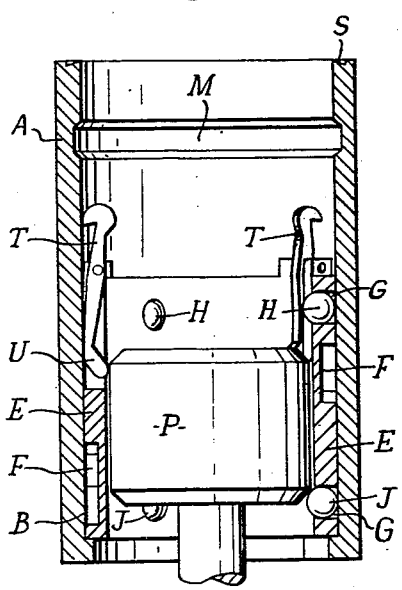

As the control rod is raised by the winch cable, the rod head moves up within sleeve E, which is in its lowermost position within housing A, freely passing the lower balls J which are free to be moved radially outwards by reason of aligning with recesses C, until the rod head contacts with the inwardly projecting upper balls H, which are incapable of radially outward movement (see FIGURE 1). Continued hoisting of the control rod causes the sleeve E to be lifted toward the upper end of fixed housing A and during this lifting movement the pins D1, D2, D3 on said fixed housing coact with similarly inclined portions or stretches F1 of the zig-zag groove F to impart an angular movement (of 30° in this embodiment) to the sleeve E in a clockwise direction. The result of this partial rotation of sleeve E is to move the balls J out of the recesses C onto the intervening lands B, as indicated in FIGURE 2. If now the control rod is lowered again the sleeve E falls with it, assisted in such movement if necessary by the rod head contacting with the inwardly projecting balls J (FIGURE 3), the underface K of the sleeve E ultimately coming to rest on the internal interrupted flange L at the lower end of housing A. During this reverse direction, that is, lowering movement of sleeve E, the fixed pins D1, D2, D3 co-act with other inclined portions or stretches F2 of groove F, but as groove stretches F2 are inclined in the opposite sense to the groove stretches F1 a further angular movement (also of 30°) is imparted to sleeve E, still in a clockwise direction. In this position the rod is latched, the balls J projecting inwardly.

If the up-and-down movement of the control rod P is then repeated, resulting in continued clockwise rotation of sleeve E through two further steps of 30° each, the total angular displacement of sleeve E is brought to 120° and the components are brought to relative positions equivalent to those shown in FIGURE 1. This permits the control rod to be lowered right through sleeve E.

From the foregoing it will be understood that sleeve E makes one complete revolution about its longitudinal axis for every six up-and-down movements of the rod, and that a cycle of operations is completed three times in each such revolution.

Figure 8:
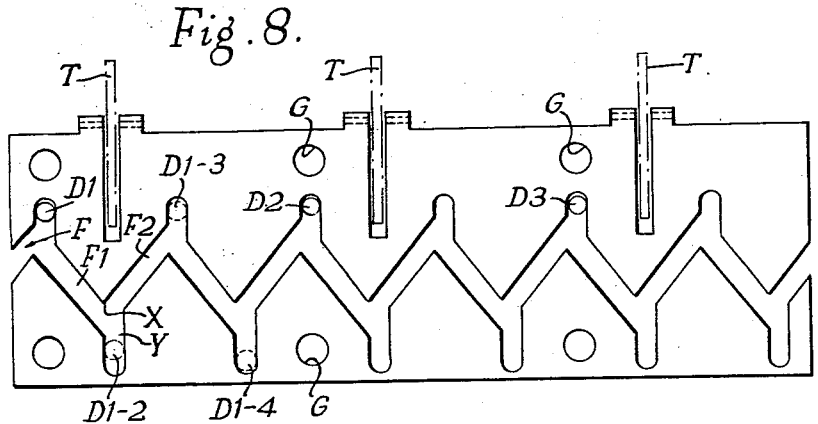
Figure 6:
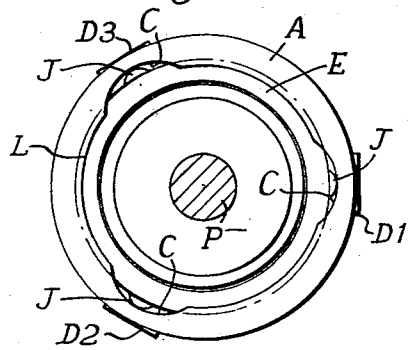
FIGURE 6 is a plan view from beneath corresponding to FIGURE 1.
Figure 7:
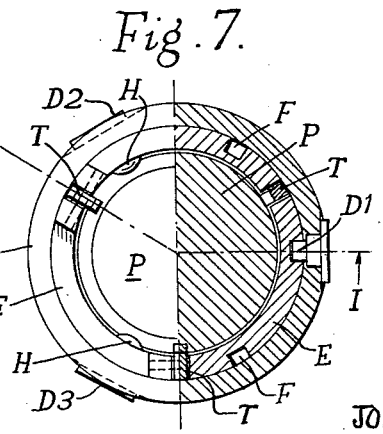
FIGURE 7 is a sectional plan on line VII—VII of FIGURE 1.

In FIGURE 8, the pins D1, D2 and D3 are shown in positions corresponding to FIGURE 1, and in addition the pin D1 is indicated also in the positions it assumes relative to groove F in the various stages, as illustrated in FIGURES 1, 2, 3 and 4, these positions being designated D1–1, D1–2, D1–3 and D1–4 respectively. The pin D1 then assumes the position at D2 to complete one latching and unlatching operation. It will be noted from FIGURE 8, that each of the similarly inclined stretches F1 meets its associated oppositely inclined stretch F2 at a peak X, which is offset in advance of a branch slot Y provided for the accommodation successively of the pins D1, D2, D3, so that as the sleeve E is lowered the pins are guided unerringly into the groove stretches F2, the reverse arrangement is provided between the stretches F2 and F3.

If the control rod is to be completely removed for any reason, it is lifted above the normal fully retracted position so as to raise the sleeve E and dispose the upper balls H opposite the counterbore M, thus allowing of radially outward movement of said balls to permit the control rod to be drawn right up through sleeve E as shown in FIGURE 4.

As the sleeve E is raised the triggers T engage groove S to maintain the sleeve in the raised position which is convenient for the replacement of the control rod. When the control rod is replaced, the descending head engages tails U on the triggers to release the triggers from groove S (FIGURE 5) whereupon, after the rod P has passed clear of balls H, the sleeve is free to descend to a position as shown in FIGURE 1.

It will be appreciated that the rod may be removed upwardly from and reintroduced into the device with the sleeve E in the FIGURE 4 of the FIGURE 2 position. If it is required to restrict such removal and reintroduction of the rod to only one of these positions, then a series of three vertical slots may be provided instead of groove M.

The invention is not restricted to use with vertically reciprocable rods of a nuclear reactor but can also be used with horizontal reciprocable rods. In the latter case, triggers T may be arranged at both ends of the device and provided with automatic means for urging the trigger heads outwardly.

The invention may also be applied to latching of articles, which, although not in themselves rod-like, are provided with an elongated member which may take the form of a cable or rope secured to the article.

I claim:

1. In combination, a rod as hereinbefore defined and a latching device therefor, said latching device comprising relatively movable inner and outer tubular members encompassing said rod, detent elements carried on said inner member, and projectible in consequence of relative movement between said inner and outer members and between said rod and said inner member into and out of positions wherein movement on the part of said rod is imparted or not imparted to said inner member, and means interconnecting said inner and outer members to ensure unidirectional rotational movement of said inner member during alternate axial forward and reverse relative movements, between said inner and outer members, a predetermined number of such relative movements causing said elements to latch or unlatch said rod.

2. A combination as claimed in claim 1, wherein said detent elements are mounted for radial movement on said inner element and by cooperation with said outer element are adapted to project into the bore of said inner element into the path of said rod which is reciprocable therethrough, so that said rod on contacting with the inwardly projecting detent elements carries said inner member with it.

3. A combination as claimed in claim 2, in which the detent elements are constituted by balls or equivalent elements slidable in holes in said tubular inner member, said detent elements each having a diameter or equivalent dimension in the direction of radial movement thereof which is greater than the thickness of said sleeve-like member, the outer member having within its bore clearances into which said detent elements may move outwardly so that said detent elements permit the rod to pass freely unhindered.

4. A combination as claimed in claim 1, in which a pin-and-slot connection is provided to effect relative rotation between the inner and outer members.

5. A combination as claimed in claim 1 wherein means are provided for retaining the inner member in the displaced position at which it has arrived when it unlatches the rod passing therethrough.

6. A latching device for a rod as hereinbefore defined, said latching device comprising inner and outer concentric members relatively rotatable and relatively axially displaceable, said members encircling the rod; means for interconnecting said concentric members to ensure that one member performs unidirectional intermittent rotation relatively to the other member during alternate axial forward and reverse relative movement between said inner and outer members, and detent means on said inner member operable by said rod during predetermined restricted and repeated reciprocations thereof within said inner member to impart movement to said inner member, whereby after impartation of said unidirectional rotational movement to said inner member, said detent means effect coupling together of the inner and outer members and release of the rod for unrestricted endwise displacement.

7. A latching device for a rod as hereinbefore defined, said latching device comprising inner and outer concentric members relatively rotatable and relatively axially displaceable, said members encircling the rod, pin-and-slot means interconnecting said concentric members to ensure that one member performs unidirectional intermittent rotation relatively to the other member during alternate axial forward and reverse relative movement between said inner and outer members, detent means on said inner member operable by said rod during predetermined restricted and repeated reciprocations thereof within said inner member to impart movement of said member, whereby after impartation of said unidirectional rotational movement to said inner member said detent means effect coupling together of the inner and outer members and release the rod for unrestricted endwise displacement, and means for retaining said inner member in a position wherein detents which normally restrict endwise displacement of said rod are disposed so as to permit of free endwise removal and reinsertion of said rod.

8. A latching device for a rod as hereinbefore defined, said latching device comprising relatively rotatable and relatively reciprocatable inner and outer concentric telescopic sleeves, pin-and-slot connecting means imparting unidirectional rotation to said inner sleeve as it reciprocates within the outer sleeve, coupling means on said inner sleeve for cooperation alternatively with said outer sleeve and with said rod which extends through said inner sleeve, the effecting of a plurality of reciprocations of said rod relatively to said inner sleeve positioning said inner sleeve relatively to said outer sleeve so that said coupling means couple together said inner and outer sleeves to permit of withdrawal of the rod from within said inner sleeve.

9. In combination, a rod as hereinbefore defined and a latching device therefor, said latching device comprising a slidable and rotatable first sleeve encircling said rod, a fixed second sleeve encircling said first sleeve and having a recess therein, radially movable detents on said first sleeve outwardly movable by contact with said rod into said recess when said rod reciprocates sufficiently within said first sleeve and inwardly movable by restraint of said second sleeve to project within said inner sleeve into the path of said rod for engagement thereby to transmit reciprocatory movement to said first sleeve, and means interconnecting said first and second sleeves to ensure unidirectional rotational movement of said inner sleeve as the result of more than one reciprocation of said inner sleeve relatively to said fixed outer sleeve to allow of endwise displacement of said inner sleeve within said outer sleeve sufficient to align said detents opposite said recess to permit of their outward projection thereinto and thus enable said rod to pass through said inner sleeve.

10. In combination, a rod as hereinbefore defined and a latching device therefor, said latching device comprising a fixed outer sleeve having longitudinally spaced recesses therein, an inner sleeve slidable and rotatable within said outer sleeve and having zig-zag grooving therein, pin means on said outer sleeve engaging said zig-zag grooving to impart unidirectional step-by-step rotary movement to said inner sleeve as it reciprocates within said outer sleeve, and detent means movable between outwardly projecting positions when aligned with said longitudinally spaced recesses in said outer sleeve and inwardly projecting positions wherein said detent means engage said rod which extends through said inner sleeve, so that restricted reciprocation is imparted to said inner sleeve by said rod, a prescribed number of reciprocations of said rod being necessary to ensure that said pin means and zig-zag grooving impart sufficient unidirectional step-by-step rotation to said inner sleeve to bring it to a reciprocated position whereat said detent means may project towards and thus release said rod from said inner member.

11. In combination, a rod as hereinbefore defined and a latching device therefor, said latching device comprising a slidable and rotatable first sleeve encircling said rod having zig-zag grooving and two rows of through holes therein; a fixed second sleeve encircling said first sleeve and having at least one recess in its bore; a series of balls radially movable in said first sleeve through holes, said balls being outwardly movable by contact with said rod into said at least one recess when said rod reciprocates sufficiently within said first sleeve and inwardly movable to project into the bore of said inner sleeve into the path of said rod and for engagement thereby to transmit reciprocatory movement to said first sleeve; pin means in said second sleeve for cooperation with said zig-zag grooving to ensure unidirectional rotational movement of said inner sleeve as the result of more than one reciprocation of said inner sleeve relatively to said fixed outer sleeve, thereby allowing of endwise displacement of said inner sleeve within said outer sleeve sufficient to align said balls opposite said at least one recess to permit of the outward projection of one row of balls into said at least one recess and thus release said rod to pass through said inner sleeve, and hooks pivoted on said inner sleeve for hooking engagement with said outer sleeve when said inner sleeve is in the rod-releasing position.

References Cited in the file of this patent
FOREIGN PATENTS

| | | |
|---|---|---|
| 168,984 | Switzerland | Sept. 17, 1934 |
| 592,023 | Germany | Jan. 31, 1934 |